(12) United States Patent
Maurer

(10) Patent No.: US 10,875,103 B2
(45) Date of Patent: Dec. 29, 2020

(54) DEVICE FOR CLAMPING A WORKPIECE TO BE MACHINED

(71) Applicant: SMW-Autoblok Spannsysteme GmbH, Meckenbeuren (DE)

(72) Inventor: Eckhard Maurer, Oberteuringen (DE)

(73) Assignee: SMW-AUTOBLOK Spannsysteme GmbH, Meckenbeuren (DE)

(*) Notice: Subject to any disclaimer, the term of this patent is extended or adjusted under 35 U.S.C. 154(b) by 0 days.

(21) Appl. No.: 16/541,313

(22) Filed: Aug. 15, 2019

(65) Prior Publication Data
US 2020/0055124 A1   Feb. 20, 2020

(30) Foreign Application Priority Data

Aug. 15, 2018 (EP) ..................... 18189124

(51) Int. Cl.
*B23B 31/18* (2006.01)
*B23B 33/00* (2006.01)
*B23B 31/30* (2006.01)

(52) U.S. Cl.
CPC ............ *B23B 31/18* (2013.01); *B23B 33/005* (2013.01); *B23B 31/30* (2013.01); *B23B 31/305* (2013.01); *B23B 2231/22* (2013.01); *Y10T 279/1029* (2015.01); *Y10T 279/12* (2015.01); *Y10T 279/18* (2015.01)

(58) Field of Classification Search
CPC ..... B23B 31/18; B23B 31/305; B23B 33/005; Y10S 279/901; Y10T 279/1029; Y10T 279/1216; Y10T 279/18
See application file for complete search history.

(56) References Cited

U.S. PATENT DOCUMENTS

| | | | | |
|---|---|---|---|---|
| 3,830,509 A | * | 8/1974 | Weber ................... | B23B 31/305 279/2.08 |
| 4,958,969 A | * | 9/1990 | Och ...................... | B23B 31/025 279/2.08 |
| 5,429,376 A | * | 7/1995 | Mueller ................ | B23B 31/204 279/132 |
| 5,441,284 A | * | 8/1995 | Mueller ................ | B23B 31/207 279/132 |

(Continued)

FOREIGN PATENT DOCUMENTS

| | | |
|---|---|---|
| DE | 34 27 533 | 2/1986 |
| EP | 1 757 390 | 2/2007 |
| JP | H01 199709 | 8/1989 |

*Primary Examiner* — Eric A. Gates
(74) *Attorney, Agent, or Firm* — Pandiscio & Pandiscio

(57) ABSTRACT

A device for clamping a workpiece comprises a chuck body and a drive fastened thereto, and at least one clamping jaw, which is coupled to the drive in a driveable arrangement either directly or via intermediate elements and which is or are held movably in or on the chuck body in the direction of the workpiece. This is achieved by providing a free space between the chuck body and a clamping jaw carrier accommodating the clamping jaw, in that an elastically deformable sleeve is inserted in the free space, which sleeve rests on the outside of the chuck body at two positions spaced apart from one another, and in that a pressure chamber is created between the chuck body, the sleeve, and the two support positions into which a medium can be filled, whereby to bulge the latter in the direction of the clamping jaw carrier between the support positions.

10 Claims, 3 Drawing Sheets

(56) References Cited

U.S. PATENT DOCUMENTS

| | | | | |
|---|---|---|---|---|
| 5,769,487 | A  * | 6/1998 | Michler | ................ B23B 31/305 |
| | | | | 269/48.1 |
| 6,499,746 | B2 * | 12/2002 | Taglang | ................ B23B 31/185 |
| | | | | 279/106 |
| 7,147,232 | B2 * | 12/2006 | Andre, Sr. | ............ B23B 31/305 |
| | | | | 279/2.05 |
| 8,944,438 | B2 * | 2/2015 | Andre | ................... B23B 31/305 |
| | | | | 279/2.08 |

* cited by examiner

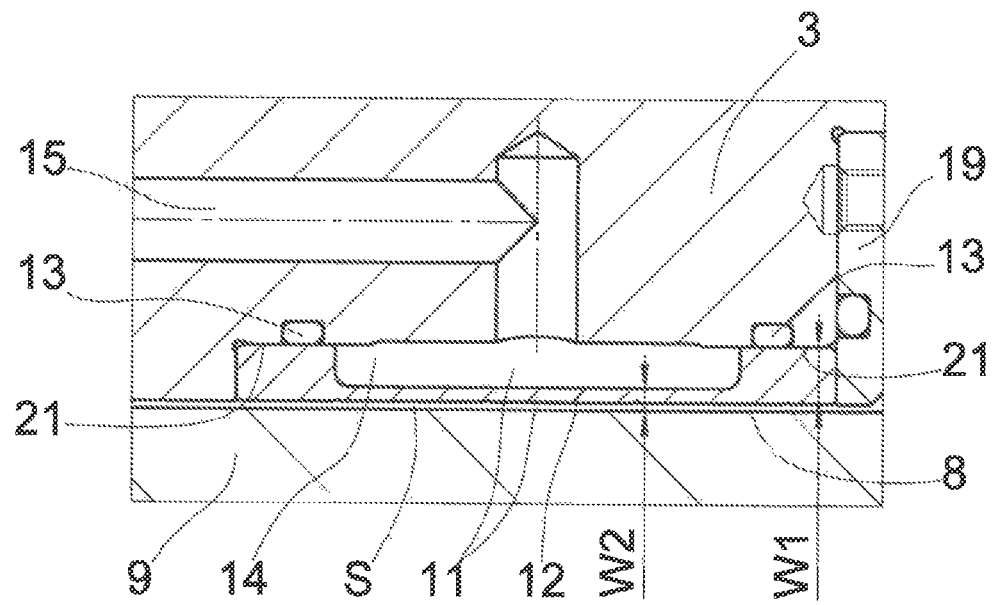
FIG. 3a  Detail A
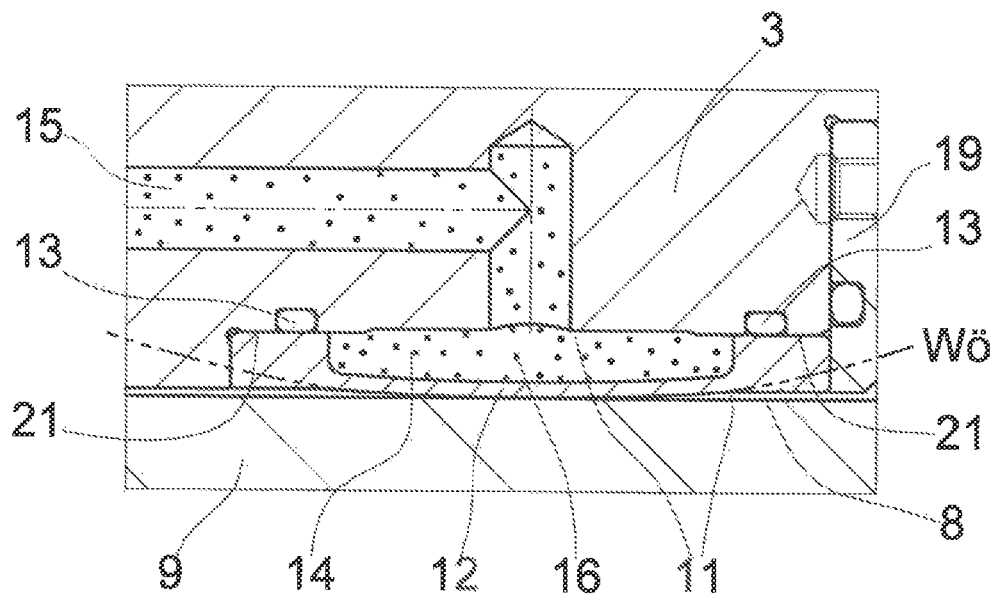
FIG. 3b  Detail A

DEVICE FOR CLAMPING A WORKPIECE TO BE MACHINED

REFERENCE TO PENDING PRIOR PATENT APPLICATION

This patent application claims benefit of European Patent Application No. 18 189 124.3, filed Aug. 15, 2018, which patent application is hereby incorporated herein by reference.

FIELD OF THE INVENTION

The invention refers to a device for clamping a workpiece to be machined, in particular a chuck or vice having a chuck body and a drive fastened thereto, and having at least one clamping jaw which is coupled to the drive in a drivable arrangement either directly or via intermediate elements, and which is/are held movably in (or on) the chuck body in the direction of the workpiece.

BACKGROUND OF THE INVENTION

For example, EP 1 757 390 A1 discloses, and other clamping devices provide examples of, the design of such devices, by means of which the workpiece to be machined is to be supported in a predetermined position on a machine tool or its tool table in order to exert corresponding machining forces on the workpiece. The workpiece is often set in rotation so that additional centrifugal forces occur which must be supported by the clamping device. Accordingly, such clamping devices consist of at least one clamping jaw which can be moved axially in the direction of a fixed stop so that the workpiece can be fixed between the clamping jaw and the stop or another axially movable clamping jaw. Power chucks must be provided with at least three movable or pivotable clamping jaws which are moved towards the centre of the chuck body or towards the workpiece to be machined, in which case the workpiece runs between these clamping jaws and is held centrally in space by them.

The clamping jaws are mounted on a clamping jaw carrier, so that the clamping jaws can be easily replaced depending on the size of the workpiece to be clamped or its geometric condition, in order to achieve an optimum clamping situation. The clamping jaw carrier is connected either directly or via intermediate elements to a drive, for example in the form of a spindle or an electric motor, and thus moves relative to a chuck body supporting the clamping jaw carrier. The drive is firmly connected to the chuck body.

With such clamping devices, it has been shown that the support of the workpiece in relation to the longitudinal axis of the chuck body and/or machining axes of the machine tool is of decisive relevance, since any deviation or deflection of the workpiece from a specified actual position leads to manufacturing errors on the workpiece. Especially with precision workpieces, however, it is imperative to keep these manufacturing errors as low as possible. Nevertheless, the clamping devices of prior art between the clamping jaw carrier and the chuck body have a free space caused by their assembly, so that the machining forces that occur and the centrifugal forces that may be present cause a slight movement of the workpiece. This results in manufacturing errors.

SUMMARY OF THE INVENTION

The problem addressed by the present invention therefore concerns the further development of a device of the aforementioned type in such a way that, on the one hand, a reliable and central clamping of the workpiece in a predetermined position is achieved and, on the other hand, the bearing of the clamping jaw carrier on the chuck body is without backlash in the clamped condition in order to prevent any possibility of movement of the workpiece relative to the chuck body.

This problem is solved by the features of the characterizing part of Patent claim 1.

Advantageous further embodiments of the invention are described in the subordinate claims.

A free space is provided between the chuck body and a clamping jaw carrier accommodating the respective clamping jaw, an elastically deformable sleeve is inserted in the free space, which sleeve rests on the outside of the chuck body at two positions spaced apart from one another, and a pressure chamber into which a medium can be filled is created between the chuck body, the sleeve and the two support positions thereof, by which an outwardly directed compressive force acts on the wall of the sleeve and bulges it in the direction of the clamping jaw carrier between the support positions, as a result of which a backlash-free mounting of the workpiece on the chuck body is achieved so that in the clamped condition, i.e. during the machining operation, the forces occurring are completely accepted and supported in order to exclude any possibility of movement of the workpiece relative to the chuck body.

Since the pressure chamber is filled after the workpiece has been held centred in the chamber with the aid of the clamping jaws, the bearing clearance between the clamping jaw carrier and the chuck body or other air gaps between these two components caused by on-site conditions can be completely compensated. The sleeve presses the clamping jaw carrier outwards so that it is pressed against the clamping jaw carrier. Such a bulging of the sleeve occurs quickly and can be stopped at any time by switching off the pump, so that the force acting to the outside can be adjusted by the quantity of the injected medium.

There is usually no clearance between the clamping jaws and the clamping jaw carrier, since the positioning of the clamping jaws on the clamping jaw carrier is achieved by means of bolts, guide grooves or other tolerance-free component pairings.

If the clamping jaw carrier is fixed to the chuck body without backlash, no relative movements occur on the workpiece during the machining process, so that the workpiece is permanently aligned in the specified clamping position. The advantage of this is that the machining process can be carried out with high precision, which means that all machined workpieces with identical geometry can be machined without error deviations.

The sleeve is an elastically deformable component. The elasticity of the sleeve in a certain area is ensured by the fact that two positions of the sleeve which are spaced apart from one another have a considerably thicker wall thickness than the wall of the sleeve running between them, so that the compressive forces acting on the sleeve from the pressure chamber cause a bulging of the thinner wall of the sleeve, whereas in the thicker wall area the sleeve has a support position on the chuck body and there is no bulging.

Axial slippage of the sleeve is prevented by a cover, by which the sleeve is held in the correct position on the chuck body after assembly and only bulging in the direction of the clamping jaw carrier takes place.

BRIEF DESCRIPTION OF THE DRAWINGS

The drawings show a device in accordance with the present invention, which is explained in more detail below. Wherein:

FIG. 3a shows a detailed view of FIG. 1, and FIG. 3b shows a detailed view of FIG. 2.

DETAILED DESCRIPTION OF THE PREFERRED EMBODIMENTS

Figure 1:
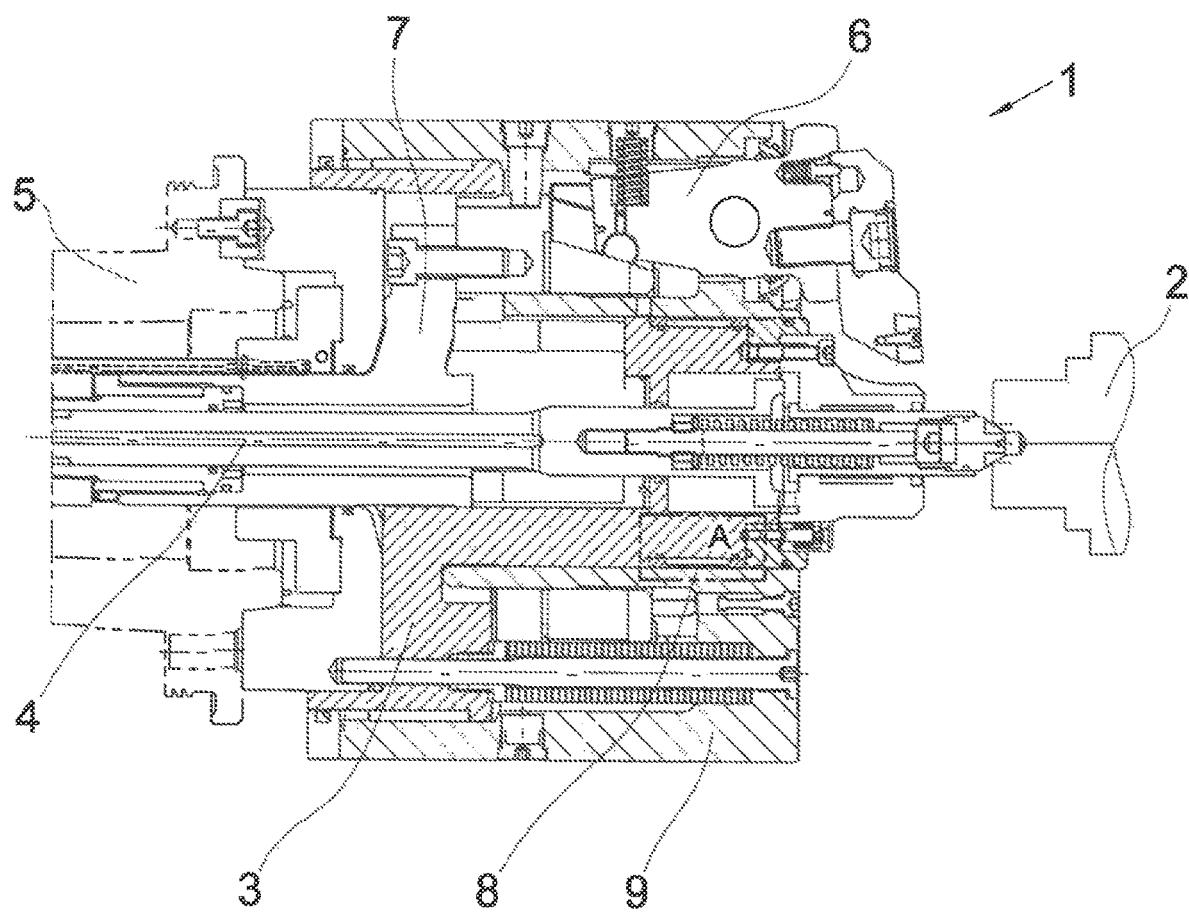
FIG. 1 shows a device for clamping a workpiece, consisting of a chuck body in which a drive is provided by means of which a clamping jaw carrier and clamping jaws fastened thereto can be moved in the direction of the workpiece, in section and in the initial state.

The device 1 shown in FIG. 1 is used to clamp a workpiece 2 to be machined in a position-oriented manner and in a specified position in space. The device 1 can be designed as a chuck or a vice. The machining forces applied by a machine tool or centrifugal forces acting on the workpiece 2 must be supported by the device 1.

Figure 2:
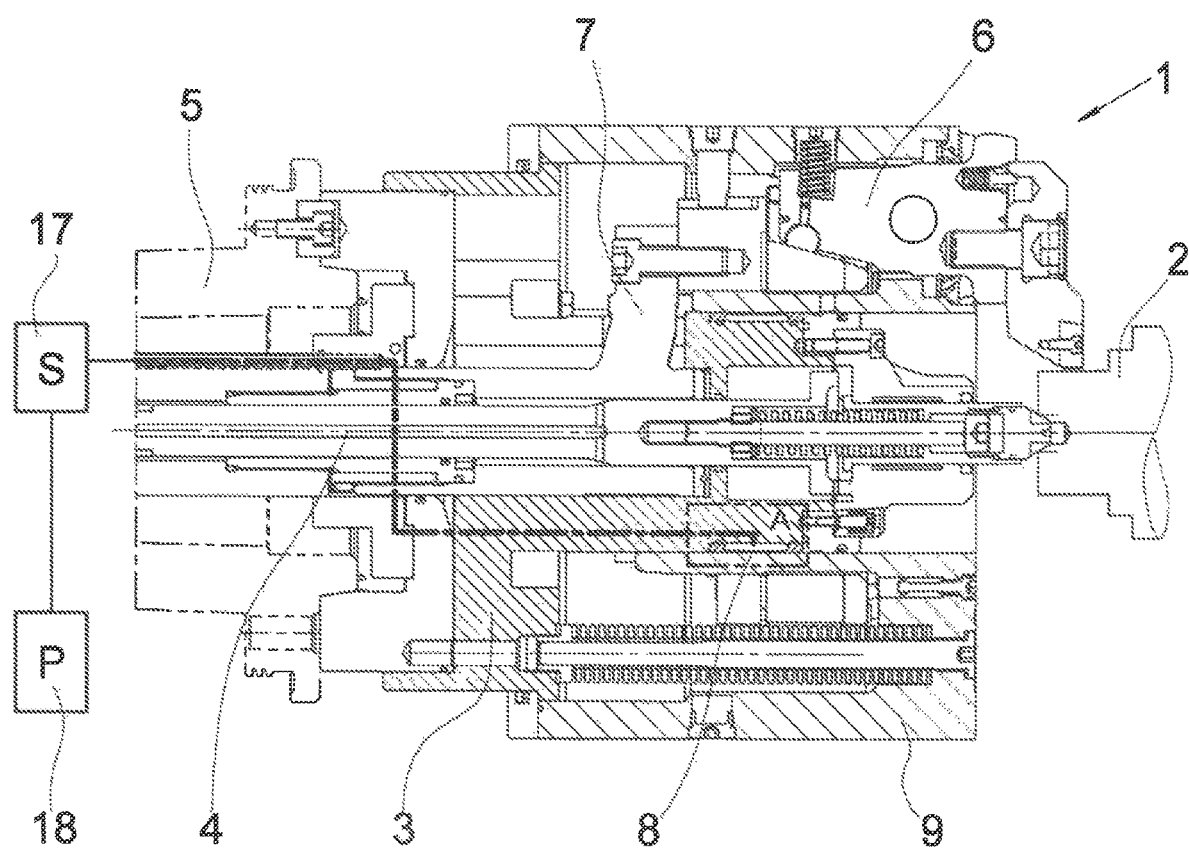
FIG. 2 shows the device according to FIG. 1, in the clamping state of the workpiece.

The device 1 consists of a chuck body 3 having a longitudinal axis marked with the reference number 4. A drive 5, for example in the form of a spindle drive, is installed in the chuck body 3, with which a clamping jaw carrier 9 that can be moved in the direction of the workpiece 2 is coupled in a drivable arrangement. The drive 5 acts on an actuating piston 7, which is coupled to the clamping jaw carrier 9. Three clamping jaws 6 are mounted on the clamping jaw carrier 9, so that when the piston 7 is actuated, both the clamping jaw carrier 9 and the clamping jaws 6 attached to it are transferred from the initial position according to FIG. 1 to the clamping position according to FIG. 2, i.e. the clamping jaws 6 are moved in the direction of the workpiece 2 and support this in a centred manner in space after the clamping operation is completed.

FIGS. 3a and 3b show that a free space 11 is incorporated in the chuck body 3, which runs between the chuck body 3 and the clamping jaw carrier 9. In addition, a channel 15 is incorporated in the chuck body 3, which is connected both to free space 11 and to an external storage tank 17. A medium 15 is stored in the storage tank 17, which can be pressed from this into the channel 15 by a pump 18.

In order to prevent the medium 15 from escaping from the free space 11, an elastically deformable sleeve 12 is inserted in this. The sleeve 12 has two wall thicknesses of different thicknesses: $W_1$ and $W_2$. The thicker wall thickness $W_1$ is assigned to a support position 21 between the sleeve 12 and the chuck body 3. The sleeve 12 with the smaller wall thickness $W_2$ runs between the two support positions 21, which are spaced apart from one another. The sleeve 12 can be made of a metallic material, of plastic or of a fabric comprising these two materials. Two O-ring seals 13 are provided to seal the free space 11 between the sleeve 12 and the chuck body 3 against water or gas. Consequently, the O-ring seals 13, the sleeve 12 and the chuck body 3 form a pressure chamber 14, which provides a liquid or gas-tight seal against the outside. The channel 15 emerges into the pressure chamber 14, so that the medium 16 can be injected by pump 18 from the storage tank 17 into the pressure chamber 14.

During the clamping process, the pressure chamber 14 is completely emptied according to FIG. 3a. Only when the clamping process is completed does the pump 18 force the medium 16 through the channel 15 into the pressure chamber 14. The medium 16 causes a deflection force acting in the direction of the clamping jaw carrier 9 which selects the wall thickness W2 of the sleeve 12 in the direction of the clamping jaw carrier 9. The bulge according to FIG. 3b of the sleeve 12 is schematically marked Wö. These bulges WÖ therefore have a t-shaped or arc-shaped outer contour in a rotationally symmetrical chuck body 3. Due to the predominant bulge WÖ of the sleeve 12, a force is produced which is directed at the clamping jaw carrier 9 and which presses the clamping jaw carrier 9 into the chuck body 3 without backlash. The bulge WÖ of the sleeve 12 should therefore be permanently present during the machining process in order to fix the clamping jaw carrier 9 without backlash, so that the occurring machining forces are supported in such a way that the predetermined clamping position of the workpiece 2 is permanently maintained.

After completion of the machining process, the pressure chamber 14 is emptied, i.e. the medium 16 is drawn back by the pump 18 into the storage tank 17 through channel 15. The medium 16 can be a hydraulic oil or a gas mixture.

In order to prevent the sleeve 12 from slipping axially, it is held against the chuck body 3 by means of a cover 19, for example via a screw-thread connection.

The idea of the present invention can be applied to all chucks or clamping devices 1 with components that have a clearance S outside the powerflow. The powerflow causes the components to be fixed in the clamped condition. If the components that move relative to each other have a clearance relative to one another that lies outside the powerflow, then there is a clearance between them. An additional force can therefore be provided by means of the sleeve 12, the course of which runs outside the existing powerflow generated by the clamping process.

What is claimed is:

1. A device (1) for clamping a workpiece (2) to be machined, the device comprising:
   a chuck body (3) and a drive (5) fastened thereto, and
   at least one clamping jaw (6), which is coupled to the drive (5) in a drivable arrangement either directly or via intermediate elements (7) and which is or are held movably in or on the chuck body (3) in the direction of the workpiece (2),
   characterised in that,
   a free space (11) is provided between the chuck body (3) and a clamping jaw carrier (9) which accommodates the respective clamping jaw (6),
   an elastically deformable sleeve (12) is inserted in the free space (11), which sleeve (12) rests on the outside (8) of the chuck body (3) at two positions (21) spaced apart from one another, and
   a pressure chamber (14) is created between the chuck body (3), the sleeve (12) and their two support positions (21), into which pressure chamber a medium (16) can be filled, by means of which a pressure force directed outwards acts on the wall ($W_2$) of the sleeve (12) and bulges it out in the direction of the clamping jaw carrier (9) between the support positions (21).

2. The device according to claim 1,
   characterised in that,
   the wall thickness ($W_1$) of the sleeve (12) in the region of the two support positions (21) is substantially thicker than the wall thickness ($W_2$) of the sleeve (12) between the two support positions (21).

3. The device according to claim 1,
   characterised in that,
   the respective clamping jaw carrier (9) is held with a predetermined clearance (S) in or on the chuck body (3) and in that the clamping jaw carrier (9) is connected or clamped to the chuck body (3) without backlash in the clamped condition by the bulge (Wö) of the sleeve (12).

4. The device according to claim 1, characterised in that,
   a channel (15) which opens into the pressure chamber (14) is incorporated in the chuck body (3),
   a reservoir (17) which is filled with the medium (16) and is connected to the channel (15) is provided on the chuck body (3) or externally, and
   the medium (16) is pressed from the reservoir (17) into the pressure chamber (14) by means of a pump (18) and vice versa.

5. The device according to claim 1, characterised in that,
   the sleeve (12) is made of a metallic material, of plastic or of a fabric made of these materials.

6. The device according to claim 1, characterised in that,
   the sleeve (12) is fixed or held against the chuck body (3) by means of a cover (19).

7. The device according to claim 1, characterised in that,
   two O-ring seals (13) are inserted between the sleeve (12) and the pressure chamber (14), which O-ring seals (13) are sealed by these seals in a liquid-tight and gas-tight manner.

8. The device according to claim 1, characterised in that,
   an O-ring seal (13) is arranged in the region of each of the support positions (21) of the sleeve (12) on the chuck body (3).

9. The device according to claim 1, characterised in that,
   the movements of the respective clamping jaws (6) or of the clamping jaw carrier (9) and the bulge (WÖ) of the sleeve (12) are separated from one another.

10. The device according to claim 1, wherein the device is a chuck or a vice.

* * * * *